Feb. 15, 1938.   H. A. SHABAKER ET AL   2,108,081
TEMPERATURE CONTROL OF CONTACT MASSES AND APPARATUS THEREFOR
Filed Jan. 30, 1935   3 Sheets-Sheet 1
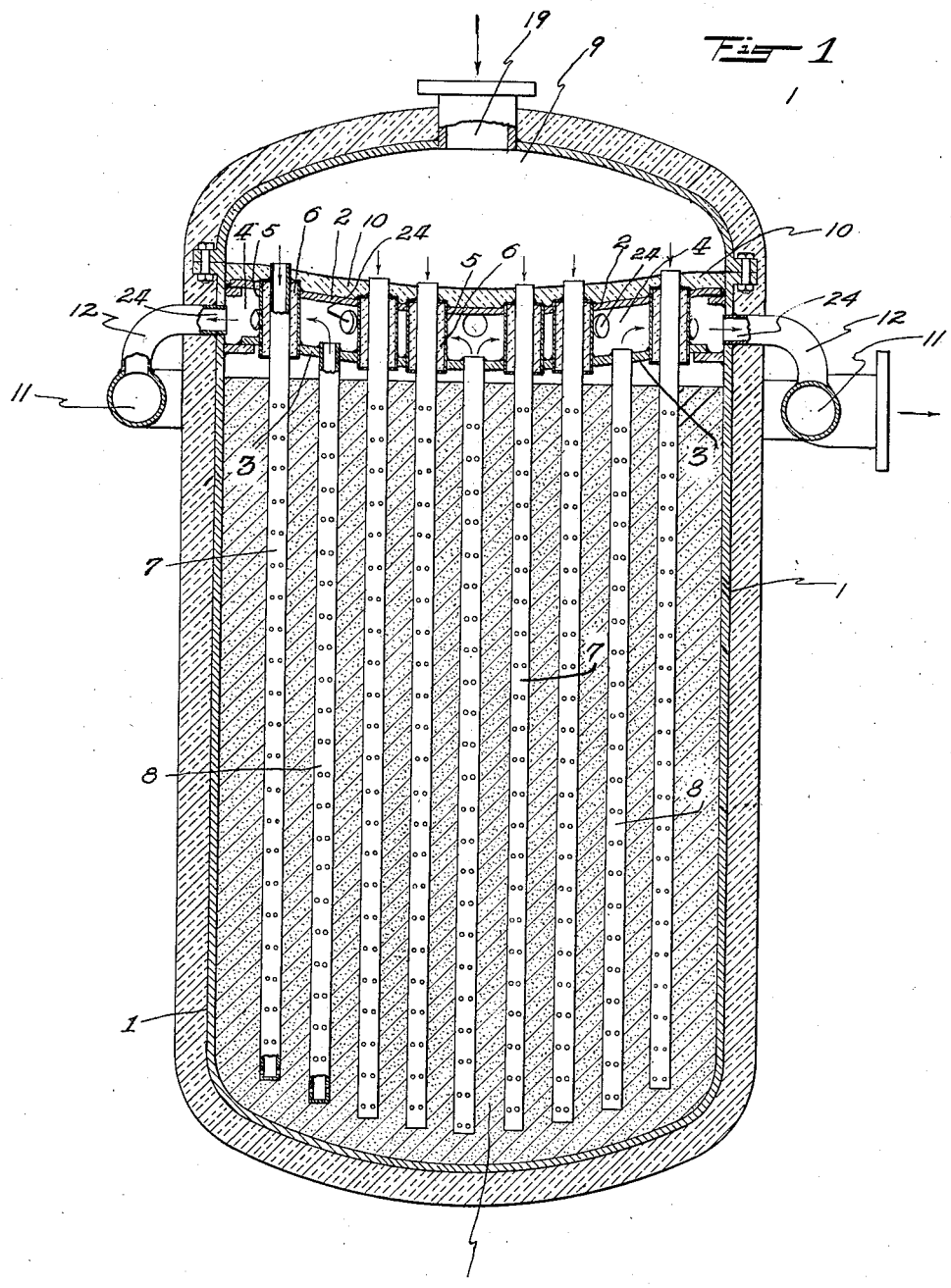
INVENTORS
Hubert A. Shabaker
Raymond C. Lassiat
BY
Ira L. Nickerson
ATTORNEY.

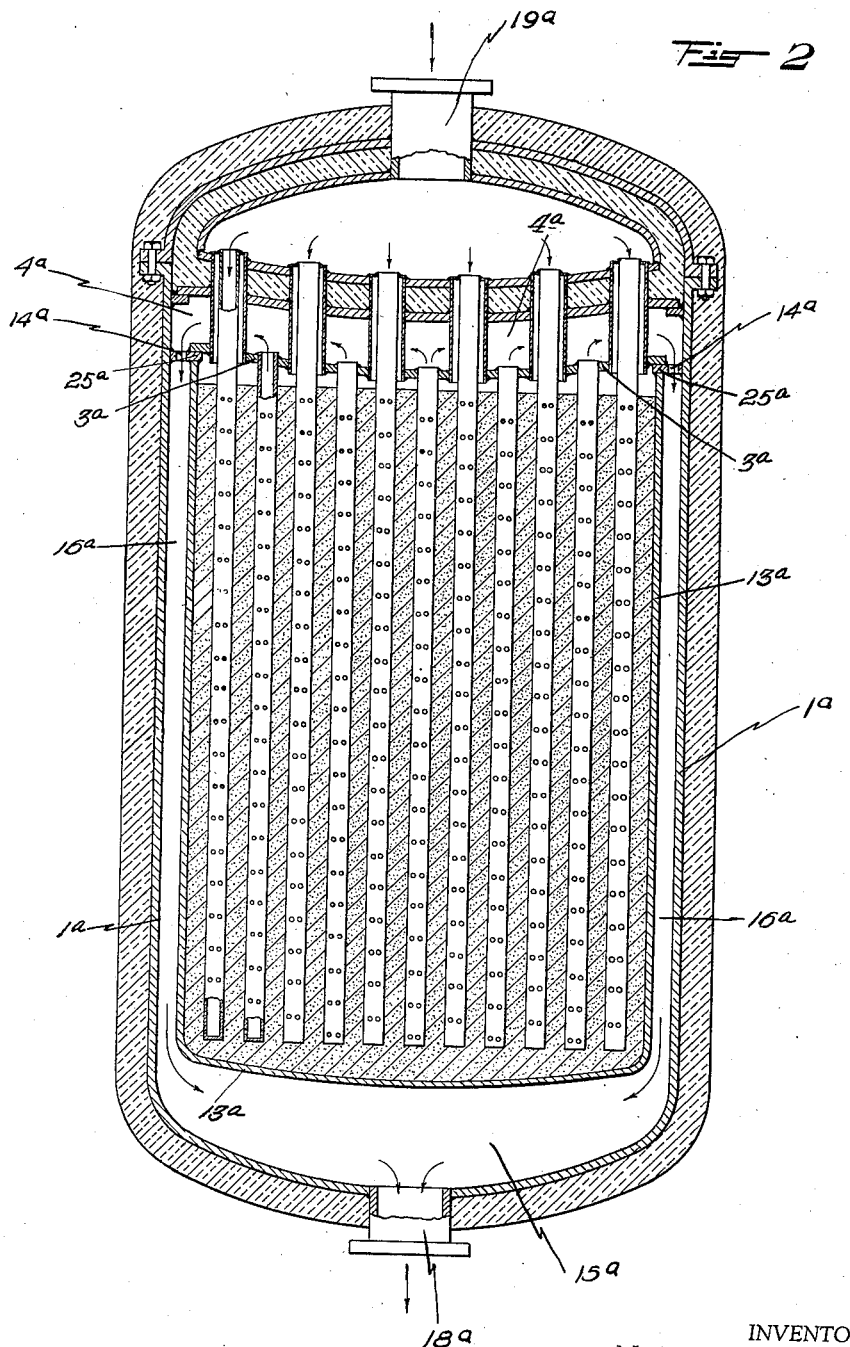

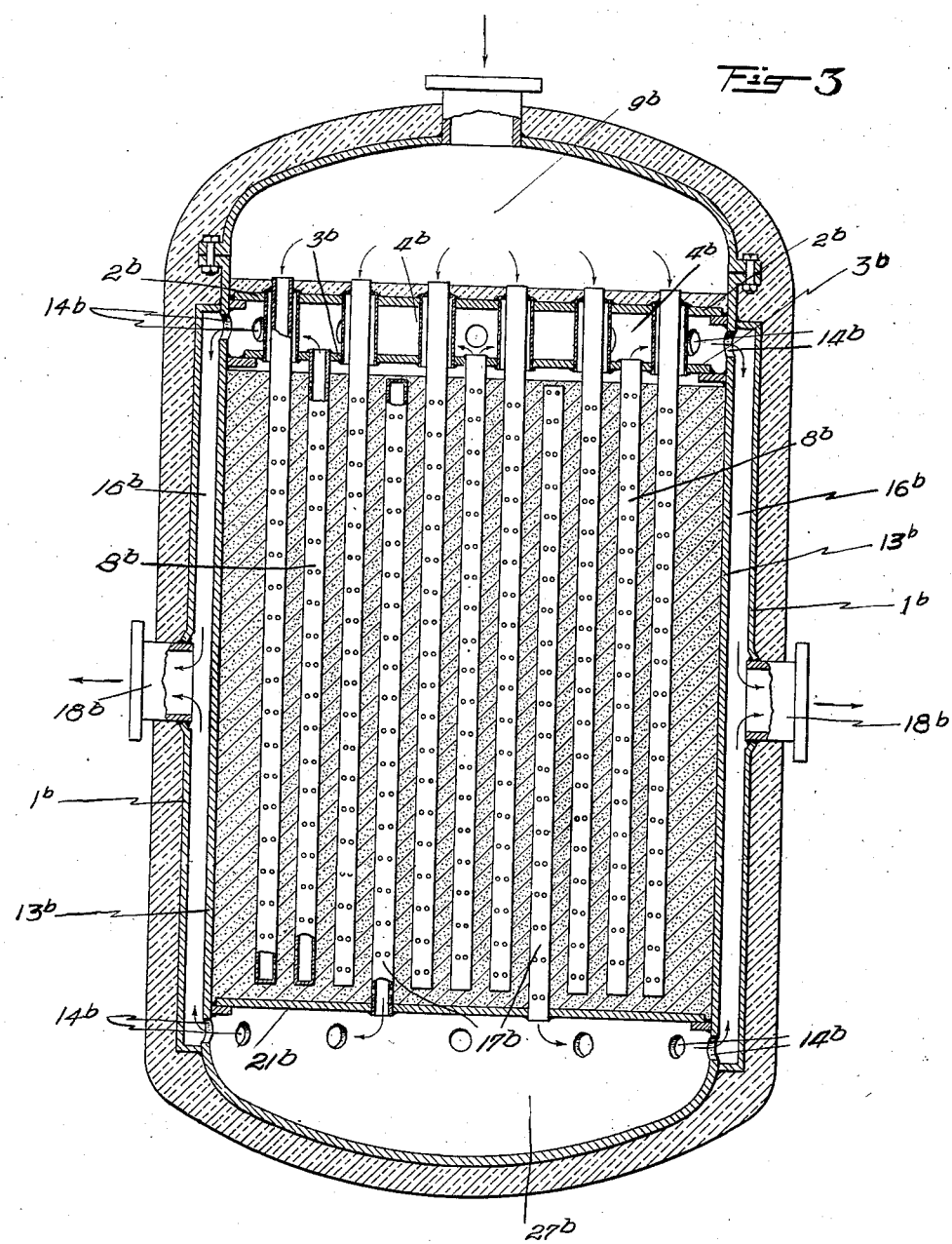

UNITED STATES PATENT OFFICE 2,108,081

TEMPERATURE CONTROL OF CONTACT MASSES AND APPARATUS THEREFOR

Hubert A. Shabaker, Media, Pa., and Raymond C. Lassiat, Woodbury, N. J., assignors to Houdry Process Corporation, Dover, Del., a corporation of Delaware Application January 30, 1935, Serial No. 4,020

19 Claims. (Cl. 23—288)

This invention relates to temperature control of contact masses, especially those portions of the mass adjacent the edges thereof. It is particularly well adapted to converters wherein the temperature of all or portions of the contact mass, which may be inert or catalytic in character or may enter into reaction with materials in contact therewith, is maintained through control of the temperature of the reactant fluids and/or manner of feeding the latter.

In converters containing a contact mass which enters into or promotes endothermic or exothermic reactions, it naturally follows that the contact mass will assume a different temperature than the material being charged to it, and those portions of the mass which are in heat exchange relation with the charge prior to its admission to the mass tend to assume a temperature lying between the two. The temperature difference between fluid reactants entering the mass and those portions of the mass in heat exchange relation therewith is relatively great when strongly exothermic or endothermic reactions are being effected in the mass. Boundary portions of the mass tend to assume lower or higher temperatures than the interior of the mass through the effect of conduction and radiation to or from the walls of the container. Close temperature control of a catalytic mass is often essential in order to realize maximum efficiency and/or yield of transformed material. Deviation in the temperature of localized portions of the mass from the temperature level of the rest of the mass results in impaired overall efficiency of the converting unit. The use of insulating means, such as lagging or the like, a practice well known to industry, minimizes heat exchange through radiation and/or convection but does not correct temperature deviations in the boundary portions of a contact mass from interior portions of the mass.

A preferred form of the invention contemplates temperature control of boundary portions of a contact mass to which fluids are delivered and/or from which fluids are vented or collected, after the manner described in the U. S. Patent No. 1,987,904, issued January 15, 1935 to Eugene J. Houdry, and in the copending application of Eugene J. Houdry, Serial No. 611,362, filed May 14, 1932, which issued June 2, 1936, as Patent No. 2,042,468 in which there are disclosed series of fluid inlet and/or fluid outlet members embedded in a contact mass to distribute fluids throughout the mass and/or collect fluids from a plurality of levels in the mass.

One object of the invention is to maintain the temperatures of the outer edges of a contact mass at substantially the same level as the temperatures of the inner portions of the mass. Another object is to restrict or even prevent heat exchange between a mass contained in a reaction zone and fluids to be charged to the zone, especially when the fluid reactants enter the reaction zone from one side thereof and fluid reaction products leave the zone from the same side. Still another object is to provide heat exchange between fluid reaction products leaving a reaction zone and any or all sides of a contact mass within the zone. Still another object is to provide a path for fluid reaction products leaving a reaction zone and passing in heat exchange relation with all boundary portions of a contact mass within the zone and/or preventing heat exchange between the mass and fluids entering therein. Still another object is to provide simple and efficient means for realizing the above objects.

The invention involves passing at least a portion, usually an important proportion, of the fluid reaction products leaving a reaction zone in heat exchange relation with those boundary portions of the contact mass adjacent the supply of fluid reactants entering the zone. In order to avoid substantial change in the temperature of the reaction products as they pass in heat exchange relation with the reaction zone, heat exchange between fluid streams of reactants and of reaction products may be restricted to any desired degree, even to the extent of substantially preventing the exchange. The invention also contemplates conducting the fluid reaction products in heat exchange relation with all other boundary portions of the mass. A portion of the fluid reaction products may pass in heat exchange relation with those boundary portions of the mass adjacent the stream of entering fluid reactants and subsequently in heat exchange relation with other boundary portions of the mass, while the remainder of said fluid reaction products may pass in heat exchange relation with the remaining boundary portions of said mass.

In order to illustrate the invention concrete embodiments thereof are shown in the accompanying drawings, in which:

Fig. 1 is a view, partially in section and partially in elevation, of one form of catalytic converter to which the invention is applicable;

Fig. 2 is a view, partially in section and partially in elevation, of a modification, and;

Fig. 3 is a view partially in section and partially in elevation, of still another modification.

In these drawings, in so far as possible, like or similar parts have been indicated by like numeral reference characters. The reference characters in Figs. 2 and 3 are differentiated from each other and from those used in Fig. 1 by the addition of the letters *a* and *b*, respectively, to the numerals.

In Fig. 1, 1 designates the shell or casing of a converter having a perforated partition or tube sheet 3 defining one end of a reaction zone or reaction chamber containing a contact mass 20. A second perforated partition 2 in spaced relation with partition 3 cooperates with the latter to define a fluid manifolding chamber or reservoir 4 adjacent said reaction zone. Said reservoir communicates with suitable fluid manifolding means, for example, with duct 11 around the casing, through ports 24 and conduits 12. An end or second fluid manifolding chamber or reservoir 9 adjacent manifolding chamber 4 is defined by partition 2 and the end of shell 1. An inlet connection 19 is provided for this chamber. Suitable means connect the reaction chamber with manifolding chamber 9 such as a series of perforated fluid distributing conduits 7 mounted in tube sheet 2 and extending through manifolding chamber 4 to be embedded in the mass 20. Similar means such as a series of perforated fluid collecting or outlet conduits 8 mounted in tube sheet 3 provide fluid communication between the reaction chamber and manifolding chamber 4. Insulating means, for example, lagging 10 on tube sheet 2, restricts heat exchange between fluids in reservoirs 4 and 9. Suitable means isolate conduits 7 from chamber 4 and restrict heat exhange between reaction products in the latter and reactants in conduits 7, for example, sleeves 5, which may or may not be filled with heat insulating material 6. They serve also as spacing means for tube sheets 2 and 3 and as supporting or mounting means for conduits 7.

When the converter is in operation, reaction products delivered to reservoir 4 pass at substantially reaction temperature in heat exchange relation with boundary portions of the mass adjacent said reservoir and serve as an insulating shield or blanket between the mass and the reactants entering the reaction chamber from reservoir 9.

The modification disclosed in Fig. 2 is a double shelled converter in which inner shell 13a providing a reaction chamber is suspended within outer casing 1a as by ring 25a, to provide an annular space 16a and an end chamber 15a between said casings. Tube sheet or partition 3a serves as one wall of said inner shell and defines one end of the reaction chamber. Ports 14a connect manifolding chamber 4a and the space between said shells thereby to provide for the free passage of fluids in the space around the inner casing and over all surfaces thereof. Fluid inlet and outlet connections, 19a and 18a, respectively, are provided in opposed ends of outer shell 1a.

In a converter of this type, the reaction products, after passing in heat exchange relation with that side of the contact mass adjacent the entering stream of reactants, are conducted in heat exchange relation with all remaining sides of the mass before being discharged from the converter. They therefore pass in heat exchange relation with all sides or boundary portions of the mass.

Fig. 3 discloses a modified type of double shelled converter including a third tube sheet or partition 21b at the opposite end of the converter from tube sheets 2b and 3b defining one end of the reaction chamber and providing a manifolding chamber 27b therebeyond. In addition to the series of fluid collecting conduits 8b to connect the reaction chamber with manifolding chamber 4b, suitable means provide fluid communication between the reaction chamber and reservoir 27b, such as a series of perforated fluid collecting conduits 17b. Outer shell 1b envelops inner shell 13b to at least the extent of the reaction chamber to form an annular space 16b between said shells. Ports 14b in the walls of reservoirs 4b and 27b provide fluid communication between these chambers and space 16b.

One or more fluid outlets 18b are provided in outer shell 1b. To secure even distribution of fluids over the surfaces of inner shell 13b a plurality of evenly spaced outlets 18b may be used and/or any known means to effect even distribution, for example, suitably arranged baffles (not shown).

In this converter the flow of reaction products from the reaction chamber is divided, a portion of said products being passed in heat exchange relation with boundary portions of the contact mass adjacent reservoir 4b and the remainder conducted in heat exchange relation with boundary portions of the mass adjacent manifolding chamber 27b. The divided products are then discharged into annular space 16b to commingle and be discharged from the converter. Obviously, all the reaction products may be discharged from the reaction chamber into manifolding chamber 27b to be passed in heat exchange relation with all boundary portions of the contact mass, as by omitting conduits 8b or mounting them in tube sheet 21b, in which case the reaction products would be vented from 4b as for example after the manner indicated in Fig. 1, utilizing, if necessary, suitable baffling to insure a reasonably uniform flow of fluids through chamber 4b.

The invention is applicable to all exothermic or endothermic reactions involving the use of contact masses which promote, assist or even enter into the reaction, for example, in the synthesis of alcohols, aldehydes, ketones, ammonia, sulphuric acid and other organic or inorganic syntheses effected with the aid of catalysts or in other exothermic or endothermic reactions such as the purification of gases or other fluids, etc., including the transformation of hydrocarbons in the presence of suitable contact masses capable of regeneration in situ by feeding reactivating media thereto. While the invention is of value in connection with converters which do not provide for distribution of reactants within the contact mass, it is most advantageous, as previously stated, when the reaction is conducted simultaneously and substantially to the same extent all through the mass. Inasmuch as such uniformity of operation is a function of distribution of the materials to be converted and of removal of products any known or suitable types of conducting elements may be utilized in addition to or as substitutes for the single conduit members disclosed herein, including the forms of nested conduit elements disclosed and claimed in the following U. S. patents which issued on January 15, 1935: 1,987,903 to E. J. Houdry, 1,987,636 to T. B. Prickett et al., 1,987,933 to J. W. Harrison, and 1,987,934 to J. W. Harrison et al.

We claim as our invention:

1. In apparatus for effecting treatment of fluids, a casing, a perforated partition therein defining a manifolding chamber at one end thereof, a second perforated partition in spaced relation to said first partition to define a second manifolding chamber in contiguity with said first manifolding chamber and one end of a reaction chamber, a contact mass in said reaction chamber, a series of perforated fluid conduits mounted in the perforations of said first partition and extending into said reaction chamber to be embedded in said mass for distributing reactant fluids therethrough, and a series of perforated fluid conduits mounted in the perforations of said second partition and extending into said reaction chamber to be embedded in said mass for conducting fluid reaction products from said mass into said second manifolding chamber to form an insulating blanket of fluid between said mass and said first manifolding chamber.

2. In apparatus for effecting chemical reactions a casing, a tube sheet therein defining one end of a chamber, a contact mass in said chamber, a second tube sheet therein in spaced relation with said tube sheet to define an end fluid manifolding chamber and an intermediate fluid manifolding chamber having ports in the walls thereof, manifolding means for fluids connected to said intermediate fluid manifolding chamber through said ports, a series of perforated fluid distributing conduits embedded in said mass and mounted in said second tube sheet, means mounted in said tube sheets for heat insulating members of said series of conduits from said intermediate chamber, and a series of perforated fluid outlet conduits embedded in said mass and mounted in said first named tube sheet.

3. In a converter for effecting chemical reactions a casing, a tube sheet therein defining one end of a reaction chamber, a contact mass therein, a second tube sheet in spaced relation with said first tube sheet to provide two manifolding chambers respectively removed from and adjacent to said reaction chamber, a series of perforated fluid conduits mounted in said second tube sheet to extend through said adjacent manifolding chamber to be embedded in said contact mass, sleeves mounted in both of said tube sheets to isolate members of said conduit series, and heat insulating material in said sleeves.

4. A converter providing a reaction chamber, a contact mass therein, means providing a pair of separate and adjacent manifolding chambers at one end of said converter and a third manifolding chamber at the other end of said converter beyond said reaction chamber, a series of fluid distributing members embedded in said mass communicating with one of said pair of manifolding chambers, and two series of fluid collecting members embedded in said mass, one of said series communicating with one of said pair of manifolding chambers and the other of said series communicating with said third manifolding chamber.

5. A converter for effecting fluid reactions comprising a casing, three partitions in spaced relation therein defining a manifolding chamber between one end of said casing and the first of said partitions, a reaction chamber between the first and second of said partitions, a second manifolding chamber between the second and third of said partitions, a third manifolding chamber between the third of said partitions and the end of said casing, a contact mass in said reaction chamber, a series of conduits embedded in said mass perforated throughout the extent of their contact therewith communicating with said third manifolding chamber, a second series of fluid conduits embedded in said mass perforated throughout the extent of their contact therewith communicating with said second manifolding chamber, a third series of fluid conduits embedded in said mass perforated throughout the extent of their contact therewith communicating with the first manifolding chamber, and means providing an elongate annular chamber surrounding said reaction chamber and interconnecting said first and second manifolding chambers.

6. A converter for effecting fluid reactions comprising a casing, three partitions in spaced relation therein defining a manifolding chamber between one end of said casing and the first of said partitions, a chamber containing a contact mass between the first and second of said partitions, a second manifolding chamber between the second and third of said partitions, a third manifolding chamber between the third of said partitions and the other end of said casing, a series of conduits embedded in said mass perforated throughout the extent of their contact therewith communicating with said third manifolding chamber, a second series of fluid conduits embedded in said mass perforated throughout the extent of their contact therewith communicating with said second manifolding chamber, a third series of fluid conduits embedded in said mass perforated throughout the extent of their contact therewith communicating with the first manifolding chamber, a shell around said casing to form an annular space for the passage of fluids around said reaction chamber, means for fluid communication between said first manifolding chamber and said annular space, and means for fluid communication between said second manifolding chamber and said annular space.

7. A converter for effecting chemical reactions comprising an outer casing, an inner casing having a tube sheet for one wall thereof, said casing being suspended in said outer casing to provide space for free passage of fluids over all the surfaces of said inner casing, a second tube sheet in spaced relation with said tube sheet defining a manifolding chamber adjacent the first named tube sheet and a second manifolding chamber adjacent the end of said outer casing, a contact mass in said inner casing, a series of fluid distributing conduits embedded in said mass communicating with said second manifolding chamber, sleeves mounted in said tube sheets to support said series of fluid distributing conduits and to isolate said conduits from the first named manifolding chamber, and a series of fluid collecting conduits embedded in said mass communicating with the first named manifolding chamber.

8. A converter for effecting exothermic and/or endothermic reactions comprising a casing, a tube sheet therein defining one end of a reaction chamber, a contact mass therein, a second tube sheet in spaced relation with said tube sheet defining an end fluid manifolding chamber and an intermediate fluid manifolding chamber, a series of fluid distributing conduits embedded in said mass communicating with said end manifolding chamber, sleeves mounted in said tube sheets to support said series of fluid distributing conduits and to isolate said conduits from said intermediate manifolding chamber, heat insulating material in said sleeves, a series of fluid collecting conduits embedded in said mass communicating with said intermediate manifolding chamber, a fluid duct around said casing, and means providing fluid communication between said intermediate manifolding chamber and said duct.

9. In apparatus for effecting chemical reactions, a converter, partitions across said converter providing a reaction chamber therein and two contiguous reservoir chambers at one end of said converter, one of said reservoir chambers being adjacent to and the other removed from said reaction chamber, means to admit fluid reactants to said removed reservoir, means to conduct said reactants into said reaction chamber, means to vent fluid reaction products from said chamber into said adjacent reservoir chamber to form an insulative blanket of fluid between said reaction chamber and said removed reservoir chamber, and means associated with one of said partitions for restricting change in the temperature of said reaction products while they remain in said adjacent reservoir chamber.

10. In apparatus for effecting chemical reactions, a casing, a partition thereacross defining one end of a chamber for containing a contact mass, a second partition across said casing in spaced relation with said first partition dividing the remaining part of said casing into two reservoirs respectively adjacent to and removed from said chamber, means communicatively connecting said adjacent reservoir and said chamber, members communicatively connecting said removed reservoir and said chamber, means mounted in said partitions to hold the same in spaced relation and to isolate said members from said adjacent reservoir, and heat insulating material associated with said last named means.

11. In a converter for effecting endothermic or exothermic fluid reactions, a casing constituting a reaction chamber, a second or outer casing completely enclosing the first casing and providing space therearound for the free passage of fluids over the entire surface of said first casing, a partition across said outer casing in spaced relation with one end of said first casing and providing a reservoir for fluid reactants at the end of said outer casing, a fluid connection in said outer casing end to admit reactants to said reservoir, means to conduct said reactants across said space between said casings and through the end of said inner casing adjacent said reservoir, means associated with said end of said inner casing to discharge fluid reaction products from said reaction chamber into said space between the casings, heat insulating means to restrict change in the temperature of said reaction products while the latter are in contact with said end of said inner casing, and a fluid connection in the opposite end of said outer casing for discharging said reaction products from the converter.

12. In apparatus for effecting chemical reactions, a casing providing fluid inlet and outlet connections at opposed ends thereof, a second or inner casing suspended within said first casing so as to provide space for the passage of fluids between said casings and over all surfaces of said inner casing, said inner casing providing a reaction chamber for containing a contact mass, a partition across the inlet end of said first or outer casing and disposed between the ends of both of said casings to provide a manifolding chamber for fluid reactants in the end of the outer casing, a series of fluid conduits mounted in said partition to extend through said end of said inner casing and into said reaction chamber for distributing said reactants within the latter, means to vent reaction products from said end of said inner casing into the space between said casings, and heat insulating means interposed between said reaction products and said reactants for restricting change in the temperature of the former as they traverse said space between said casings.

13. A converter providing a reaction chamber, a contact mass therein, means providing a pair of separate and adjacent manifolding chambers at one end of said converter and a third manifolding chamber at the other end of said converter beyond said reaction chamber, a series of fluid distributing members embedded in said mass communicating with one of said pair of manifolding chambers, and two series of fluid outlet members embedded in said mass, one of said series communicating with the other of said pair of manifolding chambers and the other of said series communicating with said third manifolding chamber, and means providing an elongate annular chamber surrounding said reaction chamber and interconnecting said third manifolding chamber and said other of said pair of manifolding chambers.

14. In effecting chemical reactions involving the use of a contact mass the process of feeding fluid reactants to the mass from one side thereof to effect the desired reaction, discharging reaction products from said mass, conducting said reaction products between said reactants and said mass to provide a heat insulative blanket thereby to prevent heat exchange between said reactants and said mass, restricting heat exchange between said reactants and said reaction products, and passing the latter in heat exchange relation with all sides of said mass.

15. In effecting chemical transformations in the presence of a contact mass contained within a reaction zone, the process of admitting fluid reactants to a manifolding zone disposed at one end of said reaction zone, distributing said reactants through said mass to effect the desired reactions, discharging a portion of the reaction products from the same side of said zone, conducting said portion of reaction products between said reaction zone and said manifolding zone thereafter conducting said reaction products in heat exchange relation with other sides of said reaction zone, discharging the remainder of said reaction products from another side of said reaction zone, and passing said remainder of said reaction products in heat exchange relation with all remaining sides of said reaction zone.

16. In effecting chemical transformations in the presence of a contact mass contained within a reaction zone, the process of admitting fluid reactants to a manifolding zone disposed at one side of said reaction zone, distributing said reactants through said mass to effect the desired reactions, discharging a portion of the reaction products from said mass at a plurality of points, venting said portion of said reaction products from the same side of said reaction zone, conducting said portion of reaction products between said reaction zone and said manifolding zone and thereafter in heat exchange relation with other sides of said reaction zone, discharging the remainder of said reaction products from said mass at a plurality of points, venting said remainder of said reaction products from a side of said reaction zone opposed to said first side, conducting said remainder of said reaction products in heat exchange relation with all remaining sides of said zone, and commingling said portions of said reaction products.

17. In effecting chemical transformations in the presence of a contact mass contained within a reaction zone, the process of admitting fluid reactants to a manifolding zone disposed at one side of said reaction zone, distributing said reactants through said mass to effect the desired reactions, discharging a portion of the reaction products from the same side of said reaction zone, conducting said portion of said reaction products between said reaction zone and said manifolding zone and thereafter in heat exchange relation with other sides of said reaction zone, restricting heat exchange between said reactants and said reaction products, discharging the remainder of said reaction products from another side of said reaction zone, and passing said remainder of said reaction products in heat exchange relation with all remaining sides of said reaction zone.

18. In effecting chemical reactions involving the use of a reaction zone containing a contact mass, the process of feeding fluid reactants to the reaction zone from one side thereof, contacting said reactants and said mass to effect the desired reaction, discharging reaction products from said mass and from said zone, thereafter conducting said reaction products between said reactants and said mass and in heat exchange relation with the latter, and interposing a heat insulative blanket between said reactants and said reaction products to restrict heat exchange therebetween while said reaction products remain in heat exchange relation with said mass.

19. In effecting chemical reactions involving the use of a reaction zone containing a contact mass, the process of feeding fluid reactants to the reaction zone from one side thereof, contacting said reactants and said mass to effect the desired reaction, discharging reaction products from said mass and from the same side of said zone, thereafter passing said reaction products while still at substantially reaction temperature between said reactants and said mass and in heat exchange relation with the latter, and interposing a heat insulative blanket between said reactants and said reaction products thereby to maintain the latter at substantially said reaction temperature while they remain in heat exchange relation with said mass.

HUBERT A. SHABAKER.
RAYMOND C. LASSIAT.